UNITED STATES PATENT OFFICE.

ALBERT F. SULZER, OF ROCHESTER, NEW YORK, ASSIGNOR TO EASTMAN KODAK COMPANY, OF ROCHESTER, NEW YORK, A CORPORATION OF NEW YORK.

CELLULOSE-ACETATE COMPOSITION.

1,398,949.   Specification of Letters Patent.   Patented Nov. 29, 1921.

No Drawing.   Application filed January 6, 1921. Serial No. 435,508.

*To all whom it may concern:*

Be it known that I, ALBERT F. SULZER, a citizen of the United States of America, residing at Rochester, in the county of Monroe and State of New York, have invented certain new and useful Improvements in Cellulose-Acetate Compositions, of which the following is a full, clear, and exact specification.

This invention relates to a new composition of matter in which cellulose acetate is combined or mixed with other substances, so that the resulting product can be satisfactorily used in the manufacture of sheets, films, varnishes and the like.

One object of my invention is to provide a composition which may be made into permanent flexible, strong and transparent films of desired thinness, that are substantially waterproof and possess the desired properties of a support for sensitive photographic coatings. Further objects will hereinafter appear.

I have discovered that a composition of matter having the desired qualities can be obtained by mixing or compounding cellulose acetate with ethyl butyrate. This compounding is best performed by mixing the cellulose acetate and ethyl butyrate with a solvent common to both, such as acetone. The cellulose acetate which I employ is the well known commercial type which is generally referred to as "acetone-soluble," and is not soluble in ethyl butyrate alone without the aid of other solvents.

In carrying out one illustration of my invention, I mix 100 parts of acetone-soluble cellulose acetate with 5 to 40 (say 30) parts of ethyl butyrate, and sufficient acetone to give a composition or dope of the desired fluidity. This amount may be widely varied by those skilled in the art, but 500 parts of acetone will give a dope that is particularly useful in the manufacture of photographic film base under the normal working conditions prevailing in this art.

The ingredients are of the commerical grade, sufficiently purified to give films or sheets of the desired transparency and relative freedom from color.

The thoroughly mixed dope or flowable composition, when filtered if desired, is flowed or deposited in long sheets or films from which the acetone rapidly volatilizes. Sufficient of the ethyl butyrate remains (because of the high boiling point and low volatility of this substance) with the cellulose acetate, so that a satisfactory transparent strong and flexible film of low inflammability results.

Having thus described my invention, what I claim as new and desire to secure by Letters Patent is:

1. A composition of matter comprising acetone-soluble cellulose acetate and ethyl butyrate.

2. A composition of matter comprising acetone-soluble cellulose acetate, ethyl butyrate and a common solvent.

3. A composition of matter comprising acetone-soluble cellulose acetate, ethyl butyrate and acetone.

4. A composition of matter comprising acetone-soluble cellulose acetate and an amount of ethyl butyrate not exceeding 40% of the weight of said acetate.

5. A composition of matter comprising cellulose acetate, an amount of ethyl butyrate not exceeding 40% of the weight of said acetate and a sufficient common solvent to make the composition flowable.

6. A composition of matter comprising acetone-soluble cellulose acetate, an amount of ethyl butyrate not exceeding 40% of the weight of said acetate and sufficient acetone to render the composition flowable.

7. As an article of manufacture, a sheet of deposited or flowed acetone-soluble cellulose acetate containing ethyl butyrate.

8. As an article of manufacture, a sheet of deposited or flowed acetone-soluble cellulose acetate containing an amount of ethyl butyrate not exceeding 40% of the weight of said acetate.

Signed at Rochester, New York, this 28th day of December, 1920.

ALBERT F. SULZER.